(12) United States Patent
Takeda et al.

(10) Patent No.: US 12,132,371 B2
(45) Date of Patent: Oct. 29, 2024

(54) STATOR

(71) Applicants: DENSO CORPORATION, Kariya (JP); TOYOTA JIDOSHA KABUSHIKI KAISHA, Toyota (JP); AISIN CORPORATION, Aichi (JP)

(72) Inventors: Ken Takeda, Kariya (JP); Takashi Matsumoto, Toyota (JP); Takahito Nozawa, Toyota (JP); Junichi Sugawara, Kariya (JP); Naoki Takahashi, Kariya (JP)

(73) Assignees: DENSO CORPORATION, Kariya (JP); TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 333 days.

(21) Appl. No.: 17/828,202

(22) Filed: May 31, 2022

(65) Prior Publication Data

US 2022/0385131 A1    Dec. 1, 2022

(30) Foreign Application Priority Data

May 28, 2021    (JP) ................................. 2021-090601

(51) Int. Cl.
*H02K 3/50*    (2006.01)
*H02K 3/38*    (2006.01)
(Continued)

(52) U.S. Cl.
CPC ............... *H02K 3/50* (2013.01); *H02K 11/25* (2016.01); *H02K 2203/09* (2013.01)

(58) Field of Classification Search
CPC .. H02K 3/50; H02K 3/46; H02K 3/38; H02K 3/32; H02K 3/28; H02K 3/04; H02K 3/12; H02K 9/00; H02K 11/25; H02K 2203/09
See application file for complete search history.

(56) References Cited

U.S. PATENT DOCUMENTS 9,419,491 B2 *   8/2016   Egami ...................... H02K 3/12
10,263,484 B2 *  4/2019   Mizutani .................. H02K 3/12
(Continued)

FOREIGN PATENT DOCUMENTS

CN    115694028 A  *  2/2023   ......... H02K 15/0068
JP    2016-123155 A    7/2016
(Continued)

*Primary Examiner* — Edgardo San Martin
(74) *Attorney, Agent, or Firm* — Oliff PLC

(57) ABSTRACT

In a stator, a stator winding is provided in a stator core and includes phase windings. A neutral-point bus bar is connected to a coil end portion of the stator winding in a radial direction thereof. The coil end portion includes first and second end portions that are joined together. The first tip end portion extends in a fixed direction in the circumferential direction. The second tip end portion extends in a direction opposite the fixed direction in the circumferential direction. The neutral-point bus bar includes a main body portion extending in the circumferential direction and connection portions extending in the radial direction from the main body portion. The connection portions are respectively connected to the phase windings in a state in which the connection portions do not protrude further towards a side opposite the stator core than the main body portion in the axial direction is.

13 Claims, 9 Drawing Sheets

(51) Int. Cl.
*H02K 3/46* (2006.01)
*H02K 11/25* (2016.01)

(56) References Cited

U.S. PATENT DOCUMENTS

| | | | |
|---|---|---|---|
| 10,439,462 B2* | 10/2019 | Hirao | H02K 15/06 |
| 10,622,861 B2* | 4/2020 | Hashimoto | H02K 3/28 |
| 10,666,110 B2* | 5/2020 | Ito | H01R 9/223 |
| 11,626,778 B2* | 4/2023 | Tsuchiya | H02K 3/50 |
| | | | 310/71 |
| 11,901,848 B2* | 2/2024 | Okamura | H02K 3/50 |
| 2016/0254717 A1* | 9/2016 | Hoshina | H02K 3/18 |
| | | | 310/71 |
| 2017/0256996 A1* | 9/2017 | Nakamura | H02K 3/28 |
| 2018/0166939 A1 | 6/2018 | Hirao | |
| 2020/0112236 A1* | 4/2020 | Hirao | H02K 15/04 |
| 2022/0320936 A1* | 10/2022 | Takada | H02K 3/28 |
| 2022/0320937 A1* | 10/2022 | Takada | H02K 3/50 |
| 2022/0385132 A1* | 12/2022 | Takei | H02K 3/50 |
| 2022/0393535 A1* | 12/2022 | Ishikawa | H02K 3/28 |
| 2023/0283138 A1* | 9/2023 | Tsuji | H02K 3/50 |
| | | | 310/71 |
| 2023/0283149 A1* | 9/2023 | Kondo | H02K 3/38 |
| | | | 310/52 |

FOREIGN PATENT DOCUMENTS

| | | | |
|---|---|---|---|
| JP | 2018-061389 A | | 4/2018 |
| JP | 2019122187 A * | | 7/2019 |
| JP | 2019134539 A * | | 8/2019 |
| JP | 2019140839 A * | | 8/2019 |
| JP | 6919586 B2 * | | 8/2021 |
| WO | WO-2015093182 A1 * | 6/2015 | ......... H02K 15/0075 |

* cited by examiner

STATOR

CROSS-REFERENCE TO RELATED APPLICATIONS

This application is based on and claims the benefit of priority from Japanese Patent Application No. 2021-090601, filed on May 28, 2021, the entire disclosure of which is incorporated herein by reference.

BACKGROUND

Technical Field

The present disclosure relates to a stator of a rotating electric machine.

Related Art

In a stator of a rotating electric machine, a configuration in which a plurality of segment conductors (or conductor segments) are used as a conductor of a stator winding is known. The stator winding is configured by the segment conductors being joined to each other in a coil end portion. A configuration in which a neutral-point bus bar is connected to the coil end portion is also known.

SUMMARY

One aspect of the present disclosure provides a stator that includes a stator core, a stator winding, and a neutral-point bus bar. The stator winding is provided in the stator core and includes a plurality of phase windings. The neutral-point bus bar is connected to a coil end portion of the stator winding on an outer side or an inner side in a radial direction of the coil end portion. The stator winding is configured by a plurality of segment conductors that are connected. The coil end portion includes: a first tip end portion in a circumferential direction of a first segment conductor, of the plurality of segment conductors, that extends in a fixed direction in the circumferential direction on an outer side in an axial direction of the stator core; and a second tip end portion in the circumferential direction of a second segment conductor, of the plurality of segment conductors, that extends in a direction opposite the fixed direction in the circumferential direction. The first tip end portion and the second tip end portion are joined together. The neutral-point bus bar includes: a main body portion that extends in the circumferential direction; and a plurality of connection portions that extend in the radial direction from the main body portion. The plurality of connection portions are connected to respective ones of the plurality of phase windings in a state in which the plurality of connection portions do not protrude further towards a side opposite the stator core than the main body portion in the axial direction is.

BRIEF DESCRIPTION OF THE DRAWINGS

In the accompanying drawings.

DESCRIPTION OF THE EMBODIMENTS

Figure 1:
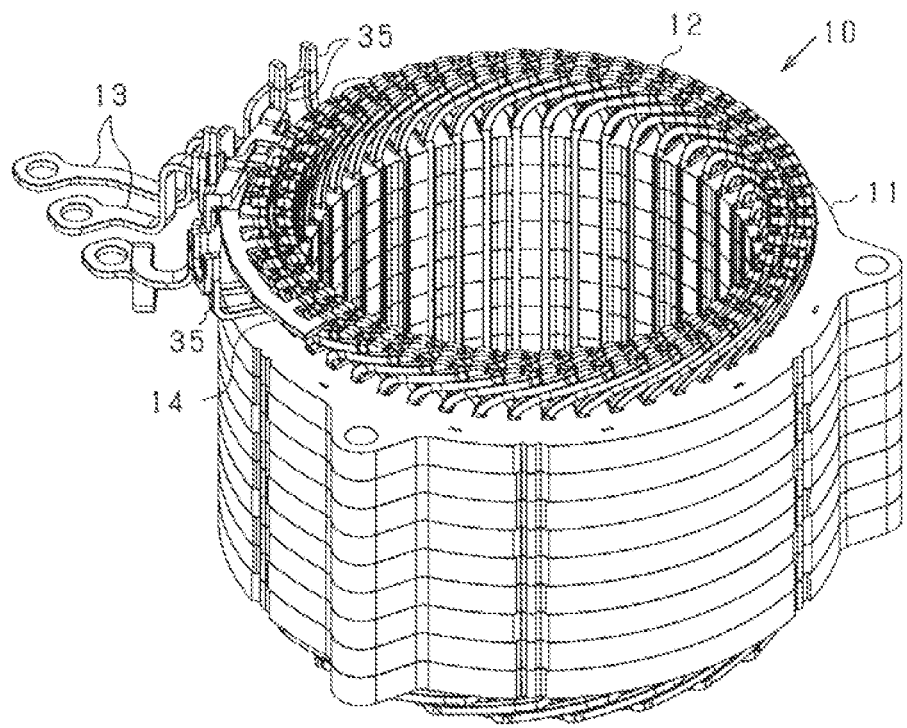
FIG. 1 is a perspective view of a stator.

In a stator of a rotating electric machine, a configuration in which a plurality of segment conductors are used as a conductor of a stator winding is known. In this case, the stator winding is configured by the segment conductors being joined to each other in a coil end portion. In addition, a configuration in which a neutral-point bus bar is connected to the coil end portion is known. For example, JP-A-2016-123155 describes a configuration in which a neutral-point bus bar includes a main body portion that extends in a circumferential direction and a plurality of terminals that extend in an axial direction from the main body portion. The terminals are each connected to the coil end portion.

However, in the stator winding that has a segment structure, in general, a tip end portion of the segment conductor extends in the axial direction, and axial-direction wire end portions are joined to each other by welding or the like. In addition, in a winding end portion of a phase winding, again, the neutral-point bus bar is joined to the axial direction wire end portion by welding or the like. Consequently, increase in an axial length of the stator is a concern. Here, in the configuration in JP-A-2016-123155, the neutral-point bus bar is connected in an intermediate position in the axial direction of the coil end portion. However, in an actual segment structure, the tip end portion of the segment conductor extends in the axial direction, and the neutral-point bus bar is connected to the axial-direction wire end portion as described above. Therefore, issues caused by increase in axial length are thought to arise.

It is thus desired to provide a stator that is capable of actualizing size reduction through shortening of an axial length.

Exemplary embodiments of the present disclosure will be described below.

A first exemplary embodiment provides a stator that includes a stator core; a stator winding that is provided in the stator core and includes a plurality of phase windings; and a neutral-point bus bar that is connected to a coil end portion of the stator winding on an outer side or an inner side in a radial direction of the coil end portion. The stator winding is configured by a plurality of segment conductors that are connected. The coil end portion includes: a first tip end portion in a circumferential direction of a first segment conductor, of the plurality of segment conductors, that extends in a fixed direction in the circumferential direction on an outer side in an axial direction of the stator core; and a second tip end portion in the circumferential direction of a second segment conductor, of the plurality of segment conductors, that extends in a direction opposite the fixed direction in the circumferential direction, the first tip end portion and the second tip end portion being joined together. The neutral-point bus bar includes: a main body portion that extends in the circumferential direction; and a plurality of connection portions that extend in the radial direction from the main body portion. The plurality of connection portions are connected to respective ones of the plurality of phase windings in a state in which the plurality of connection portions do not protrude further towards a side opposite the stator core than the main body portion in the axial direction is.

The coil end portion is configured such that the tip end portion in the circumferential direction of the segment conductor that extends in a fixed direction in the circumferential direction on the outer side in the axial direction of the stator core and the tip end portion in the circumferential direction of another segment conductor that extends in the direction opposite the fixed direction in the circumferential direction are joined together. In this case, because the tip end portions in the circumferential direction of the segment conductors are joined together, compared to a configuration in which tip end portions in the axial direction that extend in the axial direction are joined together, height in the axial direction of the coil end portion is reduced. In addition, in the neutral-point bus bar, the plurality of connection portions that extend from the main body portion in the radial direction are respectively connected to the phase windings in a state in which the connection portions do not protrude further towards the side opposite the stator core than the main body portion in the axial direction is. Therefore, increase in an axial-direction dimension is suppressed even in a connecting portion between the coil end portion and the neutral-point bus bar. Consequently, size reduction of the stator can be obtained by shortening of an axial length.

According to a second exemplary embodiment, the neutral-point bus bar is plate-shaped. The main body portion includes: a folded portion at which the main body portion is folded back in a plate thickness direction in an intermediate position in a length direction thereof; a first portion on one side of the folded portion; and a second portion on the other side of the folded portion. In the main body portion, a temperature sensor is attached so as to be sandwiched between the first portion and the second portion. In the neutral-point bus bar, the first portion and the second portion overlap in the axial direction, and at least a single connection portion is provided in each of the first portion and the second portion.

In the neutral-point bus bar, a temperature sensor is configured to be attached so as to be sandwiched between the first portion on one side of the folded portion of the main body portion and the second portion on the other side of the folded portion. At least a single connection portion is provided in each of the first portion and the second portion. Consequently, compared to a configuration in which all of the connection portions are provided in either of the first portion and the second portion, temperature changes accompanying energization of the stator winding can be accurately detected by the temperature sensor.

In addition, in the plate-shaped neutral-point bus bar, the main body portion is configured to be folded back in the plate thickness direction. In terms of the stator, the main body portion is folded back such that the first portion and the second portion overlap in the axial direction. Therefore, in the neutral-point bus bar that is formed by plate punching, for example, as a result of the main body portion being folded back after the main body portion and the connection portions are integrally formed by punching, a shape that is desired as the neutral-point bus bar can be actualized. In this case, compared to a configuration in which the main body portion is folded back such that the first portion and the second portion overlap in the radial direction, work of bending the connection portions and orienting the connection portions to the radial direction is not required. Simplification of the configuration can be achieved.

According to a third exemplary embodiment, the folded portion is formed so as to be curved in a circular arc shape. A radius of curvature of the folded portion is greater than L/2, where L is a separation distance between the first portion and the second portion.

In the temperature sensor, a thermal time constant decreases as the temperature sensor becomes smaller in size, and temperature sensitivity is improved. However, when the temperature sensor is reduced in size in the configuration in which the neutral-point bus bar sandwiches the temperature sensor, the radius of curvature of the folded portion of the neutral-point bus bar decreases, and the folded portion breaking as a result of tensile stress becomes a concern. In this regard, the radius of curvature of the folded portion is greater than L/2, where L is the separation distance between the first portion and the second portion. Consequently, tensile stress that is generated in the folded portion of the neutral-point bus bar can be reduced and occurrence of damage to the folded portion can be suppressed, while size reduction of the temperature sensor is obtained.

According to a fourth exemplary embodiment, the first portion includes: a stepped portion that has a stepped shape in the axial direction; a low portion that is a portion that is further towards the folded portion side than the stepped portion is and has a height position from an end surface of the stator core in the axial direction that is lower than that of the stepped portion; and a high portion that is a portion on an opposite side of the folded portion side of the stepped portion and has a height position from the end surface of the stator core in the axial direction that is higher than that of the stepped portion. The height position of the high portion is identical to that of the second portion. The high portion and the second portion are respectively provided with the plurality of connection portions. The plurality of connection portions are connected to tip end portions in the circumferential direction of the plurality of segment conductors.

In a configuration in which the main body portion is simply folded back in an intermediate position in the neutral-point bus bar, the height positions in the axial direction of the first portion and the second portion are thought to differ. Regarding this point, in the above-described configuration, of the first portion and the second portion, the stepped portion that has a stepped shape in the axial direction is provided in the first portion. The portion that is further towards the folded portion side than the stepped portion is the low portion of which the height position from the end surface of the stator core in the axial direction is low, and the portion on the opposite side thereof is the high portion of which the height position from the end surface of the stator core is high. In addition, the height positions in the axial direction of the high portion of the first portion and the second portion are the same. The connection portions that are provided in the high portion and the second portion are connected to the tip end portions in the circumferential direction of the segment conductors. In this case, each connection portion of the neutral-point bus bar can be connected in the same manner to the tip end portion in the circumferential direction of the segment conductor of the phase winding of each respective phase. Optimization of the configuration can be obtained.

According to a fifth exemplary embodiment, a resin sealing portion is provided in an area that includes a tip end portion in the axial direction of the coil end portion and the neutral-point bus bar. The resin sealing portion seals the coil end portion and the neutral-point bus bar by an insulating resin.

The resin sealing portion is provided in an area that includes the tip end portion in the axial direction of the coil end portion and the neutral-point bus bar. Consequently, insulation between the neutral-point bus bar and the coil end portion, and insulation between the neutral-point bus bar and the stator core can be kept in a favorable state.

According to a sixth exemplary embodiment, the main body portion of the neutral-point bus bar includes: a folded portion at which the main body portion is folded back in the axial direction; a first portion on one side of the folded portion; and a second portion on the other side of the folded portion. In the main body portion, a temperature sensor is attached so as to be sandwiched between the first portion and the second portion. An axial-direction dimension of the folded portion is greater than an axial-direction dimension of an opposing portion of the first portion and the second portion. The folded portion is formed so as to protrude towards a side opposite the stator core rather than the stator core side in the axial direction is.

In the main body portion of the neutral-point bus bar, in the configuration in which the temperature sensor is attached so as to be sandwiched between the first portion and the second portion that are folded back in the axial direction, to suppress damage to the folded portion, the axial-direction dimension of the folded portion being greater than the axial-direction dimension of the opposing portion of the first portion and the second portion can be considered. However, in this case, the folded portion is configured to protrude (swell) in the axial direction. Air bubbles remaining on an inner side of the folded portion in the resin sealing portion becomes a concern. That is, the resin sealing portion of the coil end portion being molded such that the coil end portion is immersed in a mold in which a liquid resin material is placed so as to be on a lower side in a vertical direction is considered. At this time, should the folded portion be formed so as to protrude towards the stator core side (upper side in the vertical direction), air bubbles collecting on the inner side of the protruding portion becomes a concern.

In this regard, the folded portion is formed so as to protrude towards the side opposite the stator core rather than the stator core side in the axial direction is. Consequently, air bubbles collecting on the inner side of the folded portion in the resin sealing portion can be suppressed while damage to the folded portion of the neutral-point bus bar is suppressed.

According to a seventh exemplary embodiment, an area that is not resin-sealed is provided between the resin sealing portion and an end surface of the stator core. The area serves as a cooling portion of the coil end portion.

For cooling of the stator winding, cooling (oil cooling) by a cooling oil, cooling (air cooling) by air, and the like are assumed. The area that is not resin-sealed is provided between the resin sealing portion and the end surface of the stator core. This area serves as the cooling portion of the coil end portion. Consequently, the coil end portion can be directly cooled by the cooling oil or air. The configuration is favorable in terms of cooling the stator winding.

According to an eighth exemplary embodiment, the stator core includes a plurality of slots that are formed at predetermined intervals in the circumferential direction. The stator winding includes an in-slot coil portion in which: a predetermined number of the plurality of segment conductors are arranged in the radial direction in each of the plurality of slots; and the plurality of segment conductors and the plurality of connection portions overlap in the axial direction. In the plurality of connection portions, a chamfered portion is provided at an orientation that is oblique to the axial direction on a surface that is on the stator core side in the axial direction.

In the in-slot coil portion of the stator winding, in the configuration in which the segment conductors are arranged inside the slot such that a predetermined number thereof is arrayed in the radial direction and the segment conductor and the connection portion overlap in the axial direction, interference between the connection portion that extends in the radial direction from the main body portion of the neutral-point bus bar and the segment conductor is a concern. In this regard, in the connection portion of the neutral-point bus bar, a chamfered portion is provided at an orientation that is oblique to the axial direction on a surface that is on the stator core side in the axial direction. Consequently, interference between the connection portion of the neutral-point bus bar and the segment conductor can be suppressed.

Embodiments of a rotating electric machine of the present disclosure will hereinafter be described with reference to the drawings. Here, sections among the embodiments and modifications below that are identical or equivalent are given the same reference numbers in the drawings. Descriptions of sections having the same reference numbers are applicable therebetween. For example, a motor that serves as the rotating electric machine according to the embodiment is used as an electric motor for a vehicle or an electric motor for an aircraft.

The rotating electric machine according to the present embodiment can be applied to a permanent-magnet synchronous motor, a field-winding-type motor, or an induction machine. The rotating electric machine has a three-phase winding. The rotating electric machine includes a stator 10 that has a circular cylindrical shape shown in FIG. 1, a rotor (not shown) that is arranged on an inner side of the stator 10 in a radial direction, and the like. The rotor is arranged so as to be capable of rotating around a rotation shaft relative to the stator 10. Hereafter, an axial direction refers to an axial direction of the stator 10, that is, an axial direction of the rotation shaft of the rotor. A radial direction refers to a radial direction of the stator 10, that is, a direction that passes through a center of the rotation shaft of the rotor and is orthogonal to the rotation shaft. A circumferential direction refers to a circumferential direction of the stator 10, that is, a circumferential direction around the rotation shaft of the rotor.

Figure 2:
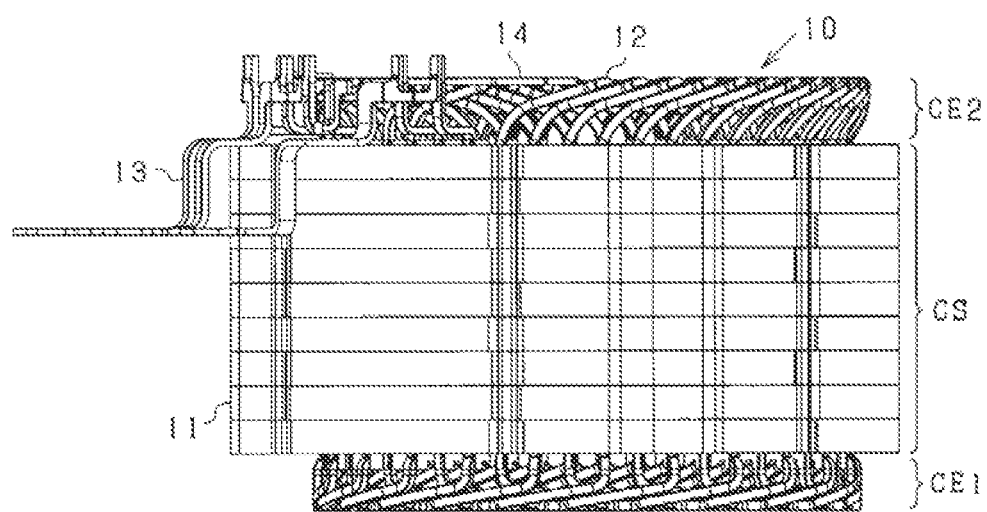
FIG. 2 is a front view of the stator.

As shown in FIGS. 1 and 2, the stator 10 includes a stator core 11 that has a circular annular shape and a stator winding 12 that is wound around the stator core 11. The rotating electric machine according to the present embodiment is an inner-rotor-type rotating electric machine. The rotor is arranged in a rotatable state on the inner side of the stator 10 in the radial direction. The stator winding 12 is a three-phase winding that has a U-phase winding, a V-phase winding, and a W-phase winding as respective phase windings of the phases. A power-line bus bar 13 is connected to one end portion of the phase winding of each respective phase and a neutral-point bus bar 14 is connected to the other end portion. In the stator winding 12, an area that overlaps the stator core 11 in the axial direction is an in-slot coil portion CS. Portions of the stator winding 12 that are further toward outer sides in the axial direction than the stator core 11 on both sides in the axial direction are coil end portions CE1 and CE2.

Figure 3:
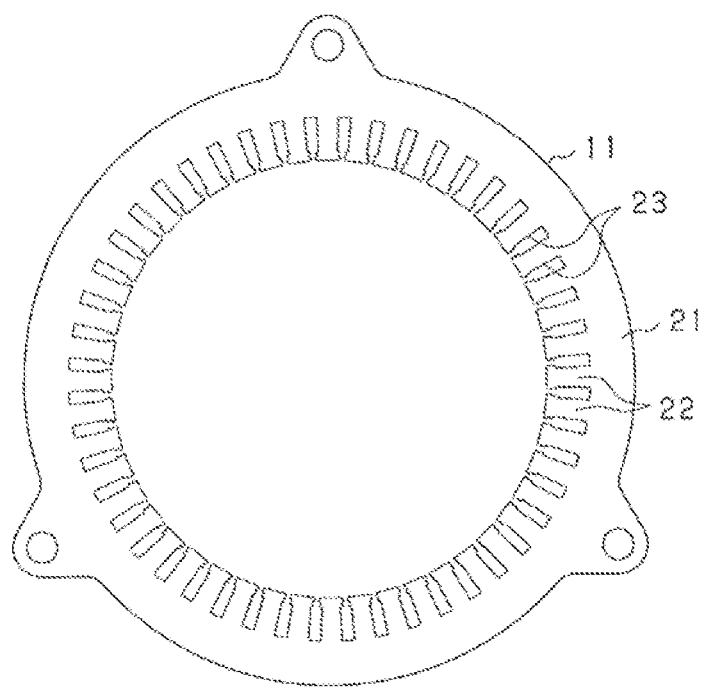
FIG. 3 is a plan view of a stator core.

As shown in FIG. 3, the stator core 11 includes a back yoke 21 that has a circular annular shape, and a plurality of teeth 22 that protrude from the back yoke 21 towards the inner side in the radial direction and are arrayed with a predetermined distance therebetween in the circumferential direction. A slot 23 is formed between adjacent teeth 22. The slot 23 has an open shape that extends such that the radial direction as a length thereof. The slots 23 are provided at even intervals in the circumferential direction in the stator core 11. In addition, the stator winding 12 is provided so as to be wound through the slots 23. For example, the stator core 11 is configured as a core-sheet laminated body in which core sheets that are composed of electromagnetic steel sheets that are magnetic bodies are laminated in the axial direction.

The stator winding 12 is configured by the three phase windings being connected by a Y connection (star connection). The stator winding 12 generates magnetic flux by electric power (alternating-current power) being supplied from a power supply through an inverter (not shown). The stator winding 12 is configured such that a plurality of segment conductors 30 that serve as segmented conductors are used. In the segment conductor 30, an electrical conductor that has a substantially rectangular cross-section (flat cross-section) and a fixed thickness is formed into a substantially U-like shape. Hereafter, a segment structure of the stator winding 12 will be described in detail.

Figure 4:
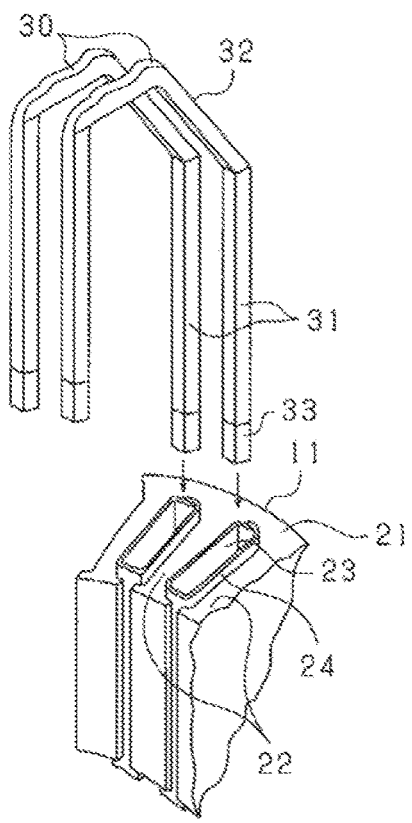
FIG. 4 is a perspective view of segment conductors and a portion of the stator core.

FIG. 4 is a perspective view of the segment conductors 30 and a portion of the stator core 11. As shown in FIG. 4, the segment conductor 30 has a substantially U-like shape, and includes a pair of straight portions 31 that form a linear shape and a turn portion 32 that is formed so as to be bent to connect the pair of straight portions 31 to each other. The pair of straight portions 31 have a length that is longer than a thickness in the axial direction of the stator core 11. The segment conductor 30 is configured using a flat conductor in which a conductor of which a lateral cross-section has a rectangular shape (a conductor that has a pair of opposing planar portions) is covered by an insulation coating. A tip end portion of each straight portion 31 serves as a conductor exposed portion 33 in which the conductor is exposed as a result of the insulation coating being cut away.

In the slot 23 of the stator core 11, the plurality of segment conductors 30 are inserted so as to be arrayed in a single row in the radial direction. According to the present embodiment, the segment conductors 30 are configured to be housed inside the slot 23 in a state in which the linear portions 31 of the segment conductors 30 are stacked in four layers. In the segment conductor 30, the pair of straight portions 31 are respectively housed in two slots 23 that are separated by a predetermined coil pitch. Of the straight portion 31, a portion that is housed inside the slot 23 corresponds to an in-slot coil portion CS of the stator winding 12. Here, an insulation sheet 24 that electrically insulates between the stator core 11 and the stator winding 12 (segment conductors 30) is provided inside the slot 23. The insulation sheet 24 is bent so as to collectively surround the plurality of segment conductors 30 that are inserted into the slot 23, and is provided so as to be sandwiched between an inner circumferential surface (inner wall surface) of the stator core 11 and the segment conductors 30 inside the slot 23.

The pair of straight portions 31 of the segment conductor 30 are respectively housed in two slots 23 such that positions in the radial direction are shifted by one. For example, when one straight portion 31 is housed in an n th position from a backmost side (back yoke side) in the radial direction, the other straight portion 31 is housed in an n+1 th position from the backmost side in the radial direction.

When the segment conductor 30 is inserted into the slot 23 of the stator core 11, of a first end side and a second end side on both ends in the axial direction of the stator core 11, the straight portion 31 of the segment conductor 30 is inserted from the first end side, and the tip end portion of the straight portion 31 protrudes from the second end side. In this case, one coil end portion CE1 is formed by the turn portion 32 of the segment conductor 30 on the first end side of the stator core 11. In addition, on the second end side of the stator core 11, a counter-turn portion side of the straight portion 31 is bent in the circumferential direction, and the straight portions 31 of differing segment conductors 30 are connected, thereby forming another coil end portion CE2. An overview of the coil end portions CE1 and CE2 are as shown in FIG. 2. Next, connection of the segment conductors 30 in the coil end portion CE2 will be described in further detail. Here, first, connection of the segment conductors 30 will be described.

Figure 5:
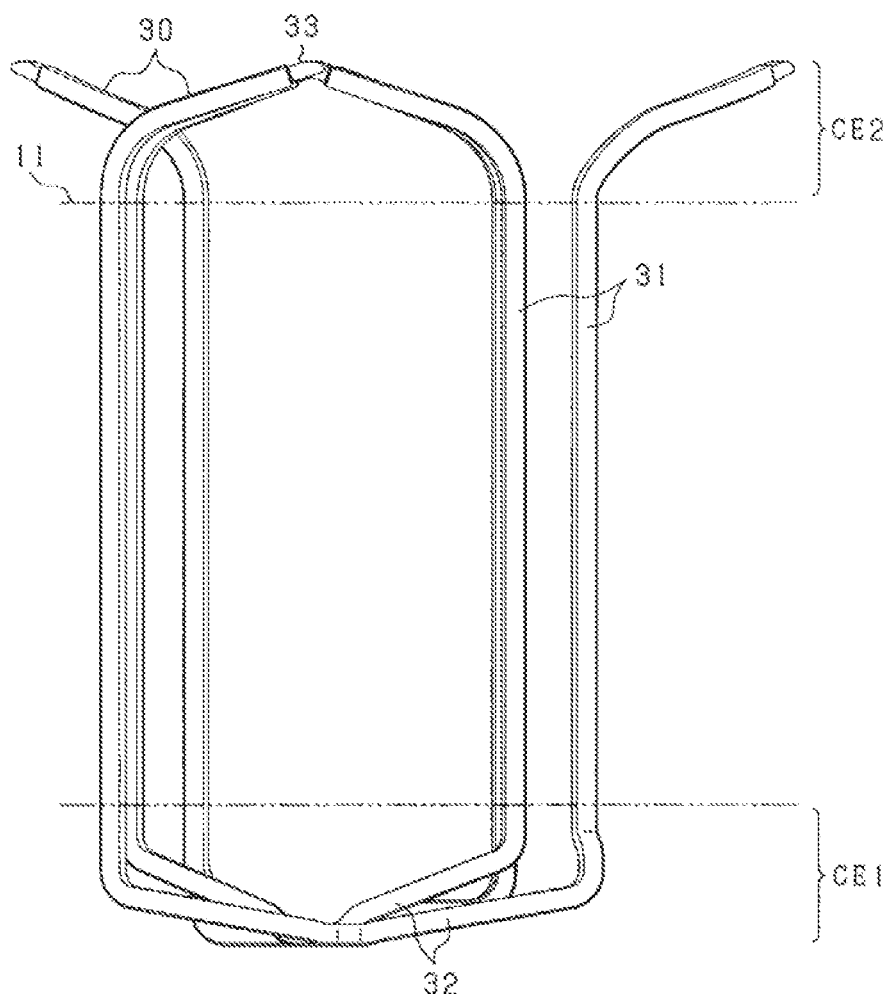
FIG. 5 is a diagram of a portion of the segment conductors in a state of being housed in a slot.

FIG. 5 is a diagram of a portion of the segment conductors 30 that are housed inside the slots 23. Here, the stator core 11 is shown by a virtual line in FIG. 5. In the segment conductor 30, the counter-turn portion side of the pair of straight portions 31 protrudes from an end surface (upper end surface in FIG. 5) in the axial direction of the stator core 11 and is bent towards the circumferential direction so as to be sloped at a predetermined angle relative to a core end surface. In addition, as a result of the conductor exposed portions 33 in the tip end portions of differing segment conductors 30 being joined by welding, the plurality of segment conductors 30 are connected.

In the coil end portion CE2, the tip end portion in the circumferential direction of the segment conductor 30 that extends in a fixed direction in the circumferential direction on the outer side in the axial direction of the stator core 11 and the tip end portion in the circumferential direction of another segment conductor 30 that extends in a direction opposite the fixed direction in the circumferential direction are joined together. As a result, the stator winding 12 is in a state in which, in the coil end portion CE2, the straight portion 31 of the segment conductor 30 extends at an orientation that is oblique to the axial direction and is folded back at a predetermined peak position. The segment conductor 30 include the counter-turn portion side of the straight portion 31 that is bent towards a same side as the turn portion 32 in the circumferential direction and the counter-turn portion side of the straight portion 31 that is bent towards a side opposite the turn portion 32.

In the phase winding of each respective phase, while conductor connection is performed by the segment conductors 30 being joined together in an intermediate portion thereof, in winding end portions, the power-line bus bar 13 of each phase or the neutral-point bus bar 14 is connected to the conductor exposed portion 33. Here, in particular, a configuration related to the neutral-point bus bar 14 will be described in detail.

Figure 6A:
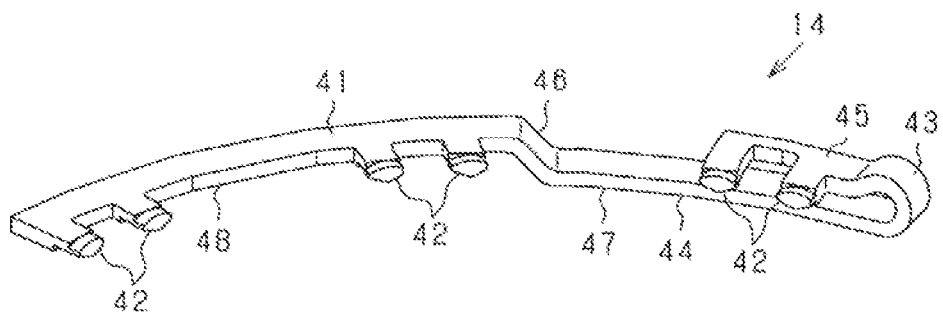
FIGS. 6A and 6B are perspective views of a neutral-point bus bar.
Figure 6B:
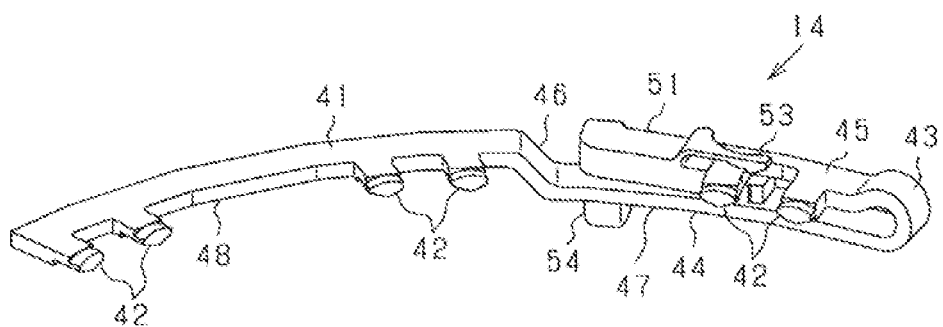
Figure 7:
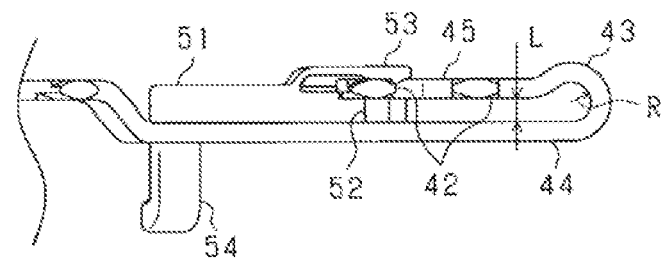
FIG. 7 is a front view of the neutral-point bus bar.

FIGS. 6A and 6B are perspective views of the neutral-point bus bar 14. FIG. 6A shows only the neutral-point bus bar 14. FIG. 6B shows a state in which a temperature sensor module 51 is assembled to the neutral-point bus bar 14. FIG. 7 is a front view in which a portion of the neutral-point bus bar 14 is enlarged.

The neutral-point bus bar 14 is composed of a flat conductor, and includes an elongated main body portion 41 and a plurality of connection portions 42 that protrude from the main body portion 41. According to the present embodiment, the phase windings are configured to be provided in two parallels for each phase in the stator winding 12. Two connection portions 42 for each phase, that is, a total of six connection portions 42 are provided. The neutral-point bus bar 14 is composed of a punched member that is punched from a flat plate and is plate-shaped. The main body portion 41 is formed in an elongated manner so as to extend in a circular arc shape, from a plan view. In terms of a state of assembly to the stator winding 12, the neutral-point bus bar 14 includes the main body portion 41 that extends the circumferential direction and the connection portions 42 that extend towards the inner side in the radial direction from the main body portion 41. The six connection portions 42 are portions that are respectively joined to the winding end portions of the phase windings of the U-phase, the V-phase, and the W-phase. Of the six connection portions 42, two connection portions 42 each that are positioned close to each other are connected to the winding end portions of the phase windings of the U-phase, the V-phase, and the W-phase. A tip end portion in the radial direction of the connection portion 42 is joined to the winding end portion of the phase winding in the coil end portion CE2.

The main body portion 41 is folded back in a plate thickness direction in an intermediate portion in a length direction, and one side is a first portion 44 and the other side is a second portion 45 with a folded portion 43 therebetween. The folded portion 43 is formed so as to be curved into a circular arc shape. A length in the length direction of the first portion 44 is longer than the length in the length direction of the second portion 45. In addition, the first portion 44 has a stepped portion 46 that is in a stepped shape in the plate thickness direction. In this case, in the state of assembly to the stator winding 12, the main body portion 41 is folded back in the axial direction and the first portion 44 is formed so as to be stepped in the axial direction. In the first portion 44, a portion that is further towards the folded portion 43 than the stepped portion 46 is a low portion 47 of which a height position from the end surface of the stator core 11 in the axial direction is low, and a portion that is on an opposite side is a high portion 48 of which the height position from the end surface of the stator core 11 in the axial direction is high.

In the main body portion 41, the low portion 47 of the first portion 44 and the second portion 45 overlap in the axial direction. In addition, height positions in the axial direction of the high portion 48 of the first portion 44 and the second portion 45 are equal. Furthermore, four connection portions 42 and two connection portions 42 are respectively provided in the high portion 48 of the first portion 44 and the second portion 45 of which the height positions in the axial direction are equal.

The temperature sensor module 51 that detects a temperature of the stator 10 is attached to the neutral-point bus bar 14. The temperature sensor module 51 has a temperature sensor 52 that includes a thermistor element. In a state of attachment to the neutral-point bus bar 14, the temperature sensor 52 is sandwiched between the low portion 47 of the first portion 44 and the second portion 45. The temperature sensor module 51 includes an engaging portion 53 that engages with the connection portion 42 that is provided in the second portion 45. The temperature sensor module 51 is attached to the neutral-point bus bar 14 in a state in which the temperature sensor 52 is sandwiched between the low portion 47 of the first portion 44 and the second portion 45, and the engaging portion 53 is engaged with the connection portion 42. In addition, the temperature sensor module 51 includes a terminal portion 54 that extends further towards the stator core 11 side than the main body portion 41 in the axial direction is. A signal line (not shown) is drawn out from a tip end portion of the terminal portion 54.

Here, in the temperature sensor 52, a thermal time constant decreases as the temperature sensor 52 becomes smaller in size, and temperature sensitivity is improved. However, when the temperature sensor 52 is reduced in size in the configuration in which the neutral-point bus bar 14 sandwiches the temperature sensor 52, a radius of curvature of the folded portion 43 of the neutral-point bus bar 14 decreases, and the folded portion 43 breaking as a result of tensile stress becomes a concern. Therefore, according to the present embodiment, when a separation distance between the low portion 47 of the first portion 44 and the second portion 45, that is, a separation distance of a sensor attaching portion is L, a radius of curvature R of the folded portion 43 is greater than L/2. As a result, reduction in tensile stress that is generated in the folded portion 43 is obtained. In this case, the folded portion 43 is shaped so as to protrude towards the side opposite the stator core 11 (upper side in the drawings) rather than the stator core 11 side (lower side in the drawings) in the axial direction is.

In the neutral-point bus bar 14, the connection portions 42 are provided so as to be distributed between the first portion 44 and the second portion 45. Therefore, when the stator winding 12 is energized in a state in which the neutral-point bus bar 14 is connected to the stator winding 12, an energization current flows on both the first portion 44 side and the second portion 45 side that sandwich the temperature sensor 52. That is, in the main body portion 41, an area from the sensor attaching portion in the first portion 44 to the sensor attaching portion in the second portion 45 with the folded portion 43 therebetween serves as an energization path during energization of the stator winding 12. Consequently, the temperature sensor 52 is capable of detecting increase in temperature accompanying energization of the stator winding 12 with favorable sensitivity.

Figure 8A:
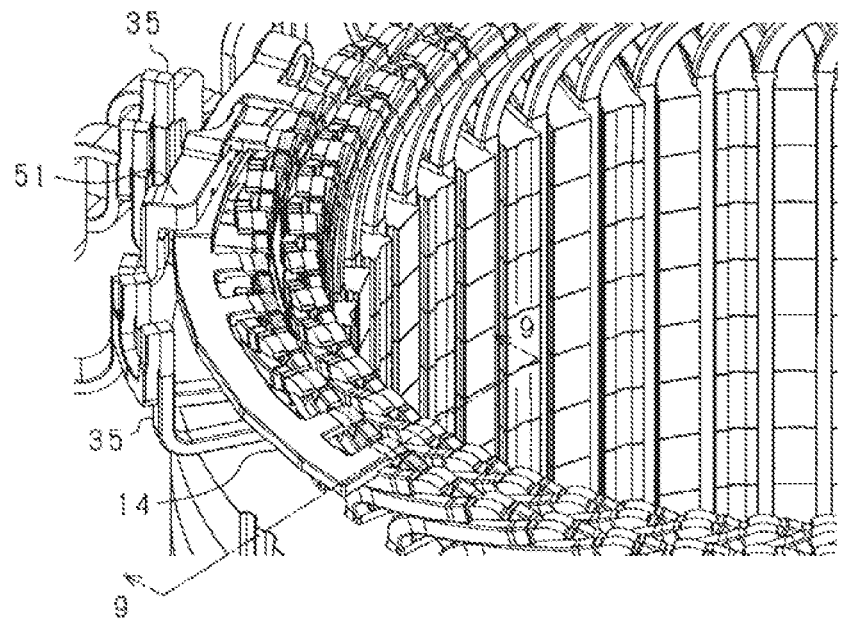
FIGS. 8A and 8B are perspective views of a state of connection of the neutral-point bus bar to a stator winding.
Figure 8B:
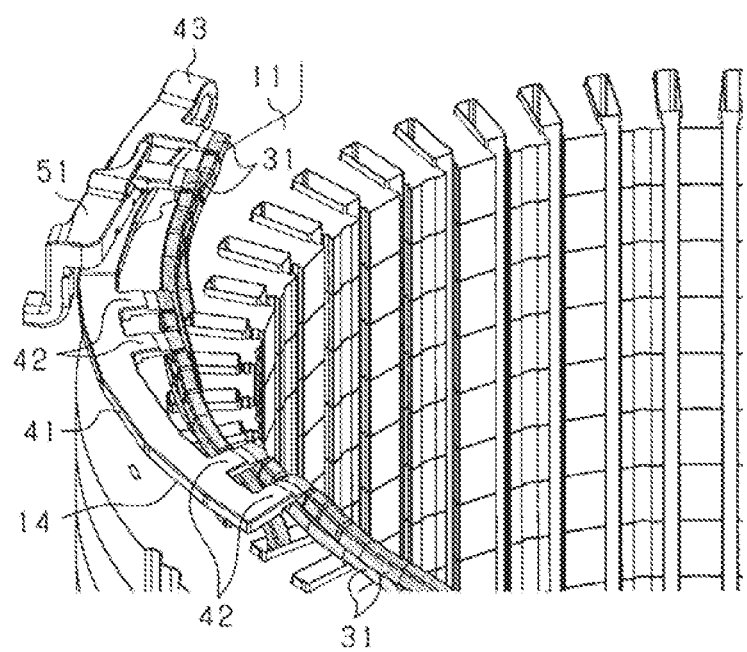

FIGS. 8A and 8B show a state of connection of the neutral-point bus bar 14 to the stator winding 12. FIGS. 8A and 8B show the same configuration as the state of connection of the neutral-point bus bar 14 to the stator winding 12, however, FIG. 8B shows only the segment conductors 30 that are the winding end portions of the phase windings, among the numerous segment conductors 30. In FIGS. 8A and 8B, for convenience, the segment conductor 30 to be connected to the neutral-point bus bar 14 is shaded.

As shown in FIGS. 8A and 8B, the neutral-point bus bar 14 is provided in a position that is on an outer side in the radial direction of the coil end portion CE2 of the stator winding 12 and opposes the end surface in the axial direction of the stator core 11. In the stator winding 12, the portion that includes the counter-turn portion side of the straight portion 31 of the segment conductor 30, that is, the winding end portion of the phase winding extends in the circumferential direction of the stator core 11, and the neutral-point bus bar 14 is connected to the winding end portion. That is, in the coil end portion CE2, in a manner similar to the intermediate portion of the phase winding, that is, the portion in which the segment conductors 30 are connected together, the counter-turn portion side of the straight portion 31 of the segment conductor extends in the circumferential direction at an orientation that is oblique to the axial direction. The connection portions 42 of the neutral-point bus bar 14 are respectively joined to the conductor exposed portions 33 of the straight portions 31.

As described above, in the neutral-point bus bar 14, the height positions of the high portion 48 of the first portion 44 and the second portion 45 are equal to each other. The connection portions 42 are provided in the high portion 48 of the first portion 44 and the second portion 45. Therefore, in the stator winding 12, with all of the segment conductors 30 that serve as the winding end portions of the phase windings in a same state, the neutral-point bus bar 14 can be connected to the conductor exposed portions 33 of these segment conductors 20.

Figure 9:
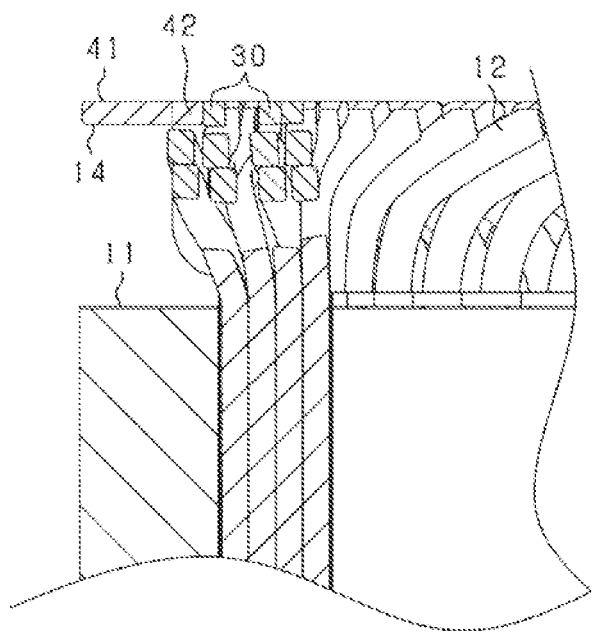
FIG. 9 is a cross-sectional view taken along line 9-9 in FIG. 8A.

FIG. 9 is a cross-sectional view taken along line 9-9 in FIG. 8A. As shown in FIG. 9, the connection portion 42 of the neutral-point bus bar 14 is connected to the stator winding 12 in a state in which the connection portion 42 does not protrude further towards the side opposite the stator core 11 than the main body portion 41 in the axial direction is.

Figure 10A:
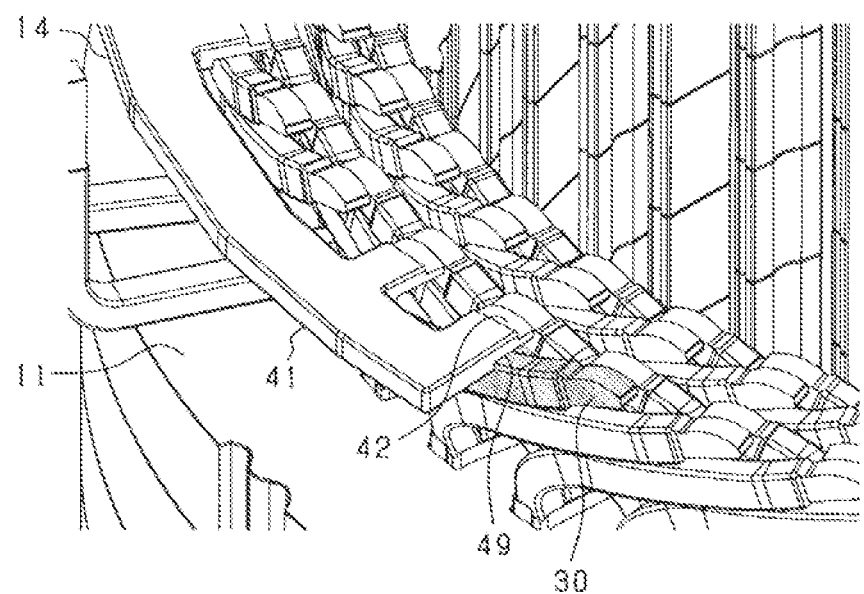
FIGS. 10A and 10B are perspective views of a state of connection of the neutral-point bus bar to the stator winding.
Figure 10B:
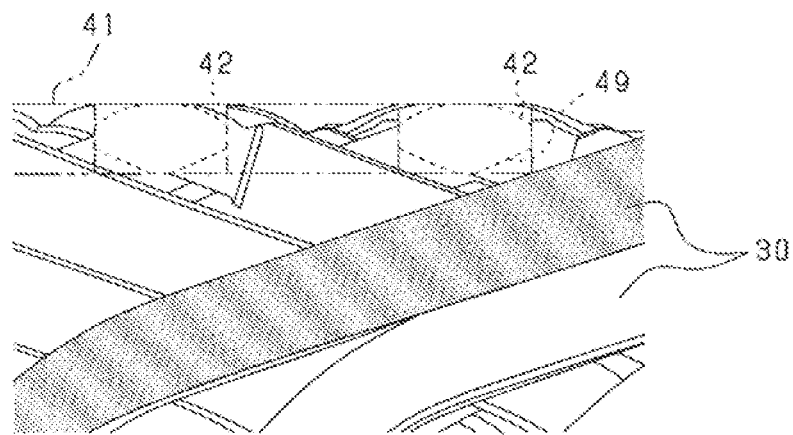

In addition, in the in-slot coil portion CS of the stator winding 12, the segment conductors 30 are arranged inside the slot 23 such that a predetermined number thereof is arrayed in the radial direction. In addition, the segment conductors 30 of a same phase that are continuous over two slots 23 are housed in positions within the slots 23 that are shifted by one in the radial direction. In this case, in the coil end portion CE2, as shown in FIGS. 10A and 10B, the connection portion 42 that extends in the radial direction from the main body portion 41 of the neutral-point bus bar 14 intersects with another segment conductor 30 (shaded segment conductor 30) that differs from the connected segment conductor 30 in the axial direction. Therefore, the connection portion 42 of the neutral-point bus bar 14 interfering with the segment conductor 30 (that is, a conductor that extends at an orientation that is oblique to the axial direction) is a concern.

Regarding this point, according to the present embodiment, in the connection portion 42, a chamfered portion 49 is provided at an orientation that is oblique to the axial direction on a surface that is on the stator core 11 side in the axial direction (a surface on the inner side in the axial direction). As a result of the chamfered portion 49, interference in the axial direction between the connection portion 42 and the segment conductor 30 is suppressed. FIGS. 10A and 10B show the chamfered portion 49 that is formed in the connection portion 42. The chamfered portion 49 is provided on the stator core 11 side of the connection portion 42.

Connection of the power-line bus bar 13 to the stator winding 12 will be briefly described below. As shown in FIG. 1, a winding end portion 35 on a side opposite the neutral point of the phase winding of each respective phase is provided so as to protrude towards the outer side in the radial direction from the coil end portion CE2. The power-line bus bar 13 of each phase is connected to the winding end portion 35.

Figure 11:
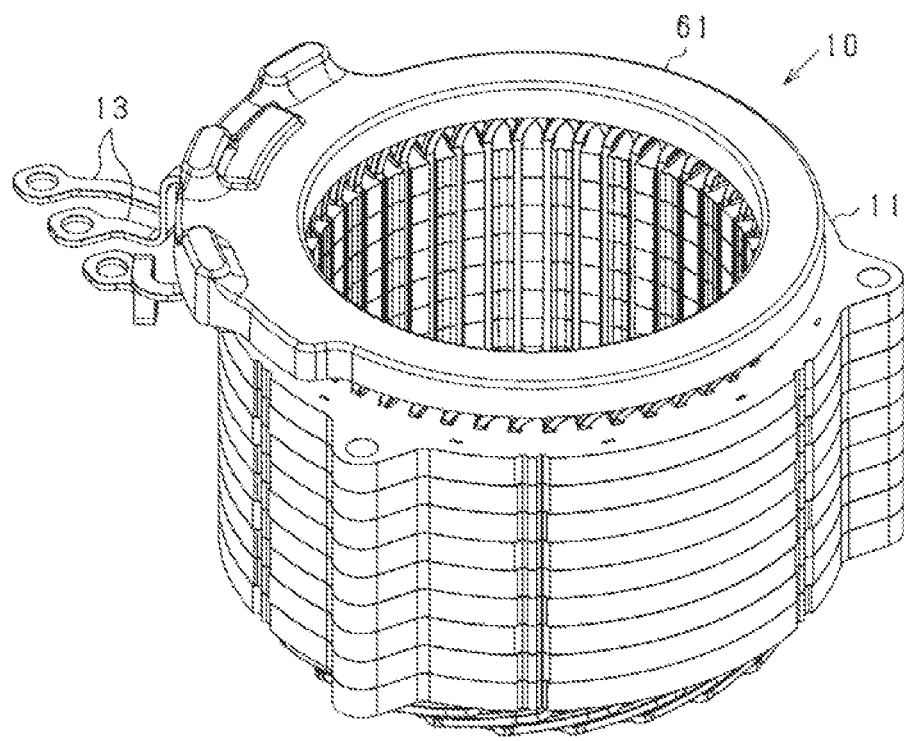
FIG. 11 is a perspective view of the stator.
Figure 12:
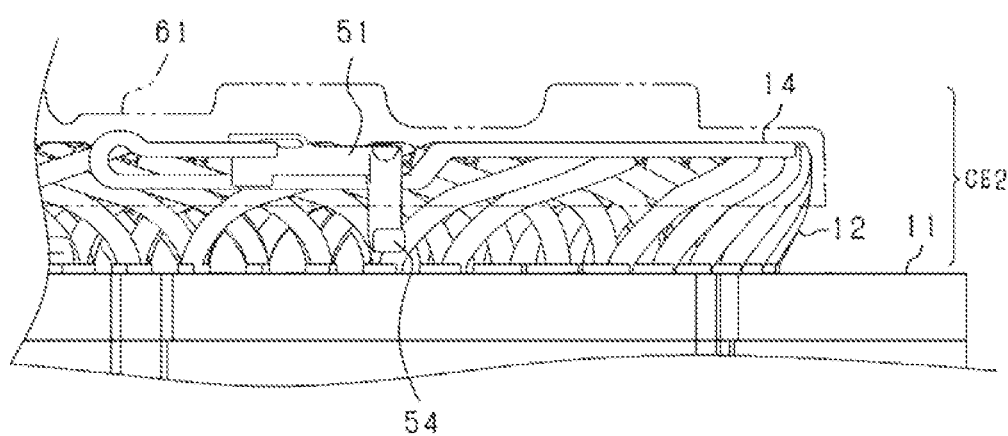
FIG. 12 is a front view of the stator.

In addition, the coil end portion CE2 is resin-sealed by an insulating resin. A configuration thereof is shown in FIGS. 11 and 12. Here, FIG. 12 shows a portion of a resin sealing portion 61 of the coil end portion CE2 in an enlarged state. However, for convenience, the power-line bus bar 13 that is connected to the winding end portion 35 is not shown. As shown in FIGS. 11 and 12, an annular resin sealing portion 61 is provided in the coil end portion CE2. The resin sealing portion 61 is formed into a circular annular shape so as to cover a welding portion of each segment conductor 30 (a fold-back peak portion of the conductor), the neutral-point bus bar 14, and a welding portion of the phase windings and the power-line bus bar 13.

The resin sealing portion 61 is provided in a partial area of the coil end portion CE2 in the axial direction. Specifically, the area in the axial direction of the resin sealing portion 61 includes the welding portion between the segment conductors 30 and the neutral-point bus bar 14, and reaches a position away from the end surface in the axial direction of the stator core 11. In this case, an area that is not resin-sealed is provided between the resin sealing portion 61 and the end surface of the stator core 11. As a result, this area can be used as a coil cooling portion that cools the stator winding 12. Here, for cooling of the stator winding 12, cooling in which a cooling oil or cooling water is used as a coolant (oil cooling or water cooling), cooling by air (air cooling), or the like is assumed.

The temperature sensor module 51 that is assembled to the neutral-point bus bar 14 is similarly covered by the resin sealing portion 61. However, the terminal portion 54 from which the signal line is drawn out in the temperature sensor module 51 is arranged outside the resin sealing portion 61.

Figure 13:
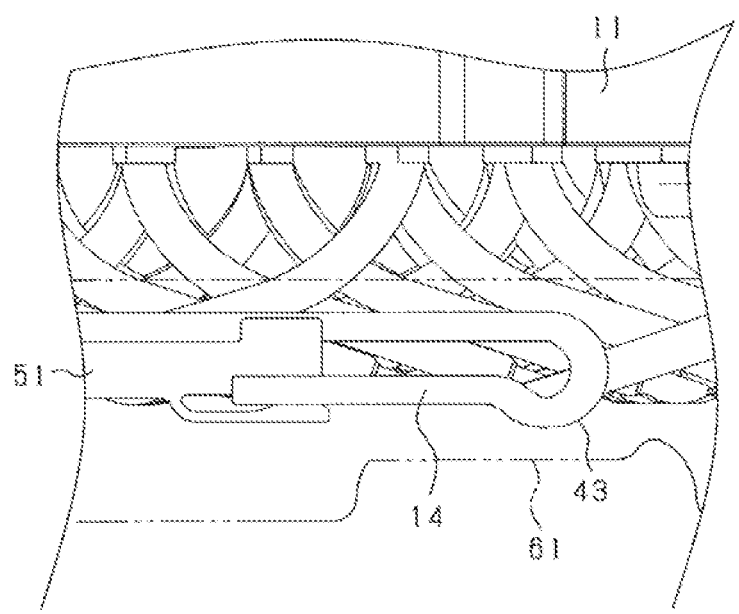
FIG. 13 is a diagram for explaining molding of a resin sealing portion in a coil end portion.

FIG. 13 is a diagram for describing molding of the resin sealing portion 61 in the coil end portion CE2. In particular, FIG. 13 shows a periphery of the folded portion 43 of the neutral-point bus bar 14 in an enlarged state. Molding of the resin sealing portion 61 is performed after the bus bars 13 and 14 are connected to the coil end portion CE2 of the stator winding 12. During molding, the coil end portion CE2 is inserted into a mold in which a liquid resin material is placed, and the resin sealing portion 61 is molded in this state. In this case, the resin sealing portion 61 is considered to be molded in a state in which the coil end portion CE2 is immersed in the mold so as to be on a lower side in a vertical direction. At this time, when the folded portion 43 is shaped so as to protrude towards the stator core 11 side (upper side in the vertical direction), air bubbles collecting on an inner side of the protruding portion becomes a concern. In this regard, according to the present embodiment, the folded portion 43 is shaped so as to protrude towards the side opposite the stator core 11 rather than the stator core 11 side in the axial direction is. Consequently, unlike a configuration in which the folded portion 43 protrudes towards the stator core 11 side, air bubbles are suppressed from remaining on the inner side of the folded portion 43 when the coil end portion CE2 is immersed in resin.

According to the above-described embodiment, the following excellent effects are obtained.

In the stator winding 12, the tip end portions in the circumferential direction of the segment conductors 30 are joined together in the coil end portion CE2. Therefore, compared to a configuration in which the tip end portions in the axial direction that extend in the axial direction are joined together, the height in the axial direction of the coil end portion CE2 is reduced. In addition, in the neutral-point bus bar 14, the plurality of connection portions 42 that extend from the main body portion 41 in the radial direction are respectively connected to the phase windings in a state in which the connection portions 42 do not protrude further towards the side opposite the stator core 11 than the main body portion 41 in the axial direction is. Therefore, increase in an axial-direction dimension is suppressed even in the connecting portion between the coil end portion CE2 and the neutral-point bus bar 14. Consequently, size reduction of the stator 10 can be obtained by shortening of the axial length.

In the neutral-point bus bar 14, the temperature sensor 52 is attached so as to be sandwiched between the first portion 44 on one side of the folded portion 43 of the main body portion 41 and the second portion 45 on the other side of the folded portion 43. In addition, at least one connection portion 42 is configured to be provided in each of the first portion 44 and the second portion 45. Consequently, compared to a configuration in which all of the connection portions 42 are provided in either of the first portion 44 and the second portion 45, temperature changes accompanying energization of the stator winding 12 can be accurately detected by the temperature sensor 52.

In addition, in the plate-shaped neutral-point bus bar 14, the main body portion 41 is configured to be folded back in the plate thickness direction. In terms of the stator 10, the main body portion 41 is folded back such that the first portion 44 and the second portion 45 overlap in the axial direction. Therefore, in the neutral-point bus bar 14 that is formed by plate punching, as a result of the main body portion 41 being folded back after the main body portion 41 and the connection portions 42 are integrally formed by punching, a shape that is desired as the neutral-point bus bar 14 can be actualized. In this case, compared to a configuration in which the main body portion 41 is folded back such that the first portion 44 and the second portion 45 overlap in the radial direction, work of bending the connection portions 42 and orienting the connection portions 42 to the radial direction is not required. Simplification of the configuration can be obtained.

When the separation distance between the first portion 44 and the second portion 45 in the overlapping portion in the axial direction is L, the radius of curvature of the folded portion 43 is greater than L/2. Consequently, tensile stress that is generated in the folded portion 43 of the neutral-point bus bar 14 can be reduced and occurrence of damage to the folded portion 43 can be suppressed, while size reduction of the temperature sensor 52 is obtained.

In a configuration in which the main body portion 41 is simply folded back in an intermediate position in the neutral-point bus bar 14, the height positions in the axial direction of the first portion 44 and the second portion 45 are thought to differ. Regarding this point, in the above-described configuration, of the first portion 44 and the second portion 45, the stepped portion 46 that has a stepped shape in the axial direction is provided in the first portion 44. The portion that is further towards the folded portion 43 side than the stepped portion 46 is the low portion 47 of which the height position from the end surface of the stator core 11 in the axial direction is low, and the portion on the opposite side thereof is the high portion 48 of which the height position from the end surface of the stator core 11 is high. In addition, the height positions in the axial direction of the high portion 48 of the first portion 44 and the second portion 45 are the same. The connection portions 42 that are provided in the high portion 48 and the second portion 45 are connected to the tip end portions in the circumferential direction of the segment conductors 30. In this case, each connection portion 42 of the neutral-point bus bar 14 can be connected in the same manner to the tip end portion in the circumferential direction of the segment conductor 30 of the phase winding of each respective phase. Optimization of the configuration can be obtained.

The resin sealing portion 61 is configured to be provided in an area that includes the tip end portion in the axial direction of the coil end portion CE2 and the neutral-point bus bar 14. Consequently, insulation between the neutral-point bus bar 14 and the segment conductors 30, and insulation between the neutral-point bus bar 14 and the stator core 11 can be kept in a favorable state.

The folded portion 43 is formed so as to protrude towards the side opposite the stator core 11 rather than the stator core 11 side in the axial direction. Consequently, air bubbles collecting on the inner side of the folded portion 43 in the resin sealing portion 61 can be suppressed while damage to the folded portion 43 of the neutral-point bus bar 14 is suppressed.

For cooling of the stator winding 12, cooling (oil cooling) by a cooling oil, cooling (air cooling) by air, and the like are assumed. An area that is not resin-sealed is provided between the resin sealing portion 61 and the end surface of the stator core 11. This area serves as the cooling portion for the coil end portion. Consequently, the coil end portion CE2 can be directly cooled by the cooling oil or air. The configuration is favorable in terms of cooling the stator winding.

In the stator winding 12, in the configuration in which the segment conductors 30 are arranged inside the slot 23 such that a predetermined number thereof is arrayed in the radial direction, and the segment conductor 30 is housed in slots 23 that are separated by a predetermined slot pitch in positions that are shifted by one in the radial direction, the connection portion 42 that extends in the radial direction from the main body portion 41 of the neutral-point bus bar 14 intersects with a segment conductor 30 other than the connected segment conductor 30 in the axial direction. Therefore, the connection portion 42 of the neutral-point bus bar 14 interfering with the segment conductor 30 in the axial direction is a concern. In this regard, in the connection portion 42 of the neutral-point bus bar 14, the chamfered portion 49 is formed at an orientation that is oblique to the axial direction on the surface that is on the stator core 11 side in the axial direction. Consequently, interference between the connection portion 42 of the neutral-point bus bar 14 and the segment conductor 30 can be suppressed.

(Modifications)

According to the above-described embodiment, a portion of the configuration thereof may be modified. Modifications of the above-described embodiment will be described below.

According to the above-described embodiment, in the stator winding 12, the phase winding is provided in two parallels for each phase. In addition, two connection portions 42 for each phase, that is, a total of six connection portions 42 are provided in the neutral-point bus bar 14. However, this configuration may be modified. For example, the phase winding may be provided in a single parallel for each phase and a single connection portion 42 may be provided for each phase (a total of three connection portions 42). In short, all that is required is that, when the phase windings of m phases are each provided by n parallel conductors, an m×n number of connection portions 42 are provided in the neutral-point bus bar 14.

In the neutral-point bus bar 14, the folded portion 43 may not be provided in the intermediate position of the main body portion 41. In this case as well, the plurality of connection portions may be respectively connected to the phase windings in a state in which the connection portions 42 do not protrude further towards the side opposite the stator core 11 than the main body portion 41 in the axial direction is.

In the coil end portion CE2, the area that is not resin-sealed is provided between the resin sealing portion 61 and the end surface of the stator core 11. However, this area may be omitted. The resin sealing portion 61 may be provided in the overall coil end portion CE2 in the axial direction.

According to the above-described embodiment, a configuration in which the present disclosure is actualized as an inner-rotor-type rotating electric machine is described. Instead, the present disclosure can be actualized as an outer-rotor-type rotating electric machine. In this case, the neutral-point bus bar 14 and the like may be provided on an inner side in the radial direction of the coil end portion CE2 of the stator winding 12.

What is claimed is:

1. A stator comprising:
a stator core;
a stator winding that is provided in the stator core and includes a plurality of phase windings; and
a neutral-point bus bar that is connected to a coil end portion of the stator winding on an outer side or an inner side in a radial direction of the coil end portion, wherein:
the stator winding is configured by a plurality of segment conductors that are connected;
the coil end portion includes
a first tip end portion in a circumferential direction of a first segment conductor, of the plurality of segment conductors, that extends in a fixed direction in the circumferential direction on an outer side in an axial direction of the stator core, and
a second tip end portion in the circumferential direction of a second segment conductor, of the plurality of segment conductors, that extends in a direction opposite the fixed direction in the circumferential direction,
the first tip end portion and the second tip end portion being joined together;
the neutral-point bus bar includes
a main body portion that extends in the circumferential direction, and
a plurality of connection portions that extend in the radial direction from the main body portion; and
the plurality of connection portions are connected to respective ones of the plurality of phase windings in a state in which the plurality of connection portions do not protrude further towards a side opposite the stator core than the main body portion in the axial direction is.

2. The stator according to claim 1, wherein:
the neutral-point bus bar is plate-shaped;
the main body portion includes
a folded portion at which the main body portion is folded back in a plate thickness direction in an intermediate position in a length direction thereof,
a first portion on one side of the folded portion, and
a second portion on the other side of the folded portion;
in the main body portion, a temperature sensor is attached so as to be sandwiched between the first portion and the second portion; and
in the neutral-point bus bar,
the first portion and the second portion overlap in the axial direction, and
at least a single connection portion is provided in each of the first portion and the second portion.

3. The stator according to claim 2, wherein:
the folded portion is formed so as to be curved in a circular arc shape; and
a radius of curvature of the folded portion is greater than L/2, where L is a separation distance between the first portion and the second portion.

4. The stator according to claim 3, wherein:
the first portion includes
a stepped portion that has a stepped shape in the axial direction,
a low portion that is a portion that is further towards the folded portion side than the stepped portion is and has a height position from an end surface of the stator core in the axial direction that is lower than that of the stepped portion, and
a high portion that is a portion on an opposite side of the folded portion side of the stepped portion and has a height position from the end surface of the stator core in the axial direction that is higher than that of the stepped portion;
the height position of the high portion is identical to that of the second portion;
the high portion and the second portion are respectively provided with the plurality of connection portions; and
the plurality of connection portions are connected to tip end portions in the circumferential direction of the plurality of segment conductors.

5. The stator according to claim 4, wherein:
a resin sealing portion is provided in an area that includes a tip end portion in the axial direction of the coil end portion and the neutral-point bus bar, the resin sealing portion sealing the coil end portion and the neutral-point bus bar by an insulating resin.

6. The stator according to claim 5, wherein:
the main body portion of the neutral-point bus bar includes
a folded portion at which the main body portion is folded back in the axial direction,
a first portion on one side of the folded portion, and
a second portion on the other side of the folded portion;
a temperature sensor is attached so as to be sandwiched between the first portion and the second portion;
an axial-direction dimension of the folded portion is greater than an axial-direction dimension of an opposing portion of the first portion and the second portion; and
the folded portion is formed so as to protrude towards a side opposite the stator core rather than the stator core side in the axial direction is.

7. The stator according to claim 6, wherein:
an area that is not resin-sealed is provided between the resin sealing portion and an end surface of the stator core; and
the area serves as a cooling portion of the coil end portion.

8. The stator according to claim 7, wherein:
the stator core includes a plurality of slots that are formed at predetermined intervals in the circumferential direction;
the stator winding includes an in-slot coil portion in which
a predetermined number of the plurality of segment conductors are arranged in the radial direction in each of the plurality of slots, and
the plurality of segment conductors and the plurality of connection portions overlap in the axial direction; and
in the plurality of connection portions,
a chamfered portion is provided at an orientation that is oblique to the axial direction on a surface that is on the stator core side in the axial direction.

9. The stator according to claim 2, wherein:
the first portion includes
a stepped portion that has a stepped shape in the axial direction,
a low portion that is a portion that is further towards the folded portion side than the stepped portion is and has a height position from an end surface of the stator core in the axial direction that is lower than that of the stepped portion, and
a high portion that is a portion on an opposite side of the folded portion side of the stepped portion and has a height position from the end surface of the stator core in the axial direction that is higher than that of the stepped portion;

the height position of the high portion is identical to that of the second portion;

the high portion and the second portion are respectively provided with the plurality of connection portions; and the plurality of connection portions are connected to tip end portions in the circumferential direction of the plurality of segment conductors.

10. The stator according to claim 1, wherein:

a resin sealing portion is provided in an area that includes a tip end portion in the axial direction of the coil end portion and the neutral-point bus bar, the resin sealing portion sealing the coil end portion and the neutral-point bus bar by an insulating resin.

11. The stator according to claim 10, wherein:

the main body portion of the neutral-point bus bar includes
- a folded portion at which the main body portion is folded back in the axial direction,
- a first portion on one side of the folded portion, and
- a second portion on the other side of the folded portion;

a temperature sensor is attached so as to be sandwiched between the first portion and the second portion;

an axial-direction dimension of the folded portion is greater than an axial-direction dimension of an opposing portion of the first portion and the second portion; and the folded portion is formed so as to protrude towards a side opposite the stator core rather than the stator core side in the axial direction is.

12. The stator according to claim 5, wherein:

an area that is not resin-sealed is provided between the resin sealing portion and an end surface of the stator core; and the area serves as a cooling portion of the coil end portion.

13. The stator according to claim 1, wherein:

the stator core includes a plurality of slots that are formed at predetermined intervals in the circumferential direction;

the stator winding includes an in-slot coil portion in which
- a predetermined number of the plurality of segment conductors are arranged in the radial direction in each of the plurality of slots, and
- the plurality of segment conductors and the plurality of connection portions overlap in the axial direction; and in the plurality of connection portions,
- a chamfered portion is provided at an orientation that is oblique to the axial direction on a surface that is on the stator core side in the axial direction.

* * * * *